(12) United States Patent
Peros et al.

(10) Patent No.: US 10,496,307 B1
(45) Date of Patent: Dec. 3, 2019

(54) REACHING A NORMAL OPERATING MODE VIA A FASTBOOT PROCEDURE

(71) Applicant: EMC IP Holding Company LLC, Hopkinton, MA (US)

(72) Inventors: Roko Peros, Holly Springs, NC (US); Christopher Dion, Marlboro, MA (US); Jochen F. De Smet, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 15/395,143

(22) Filed: Dec. 30, 2016

(51) Int. Cl.
*G06F 3/06* (2006.01)
*G06F 9/44* (2018.01)
*G06F 9/4401* (2018.01)

(52) U.S. Cl.
CPC ............ *G06F 3/0632* (2013.01); *G06F 3/067* (2013.01); *G06F 3/0617* (2013.01); *G06F 3/0683* (2013.01); *G06F 9/4406* (2013.01)

(58) Field of Classification Search
None
See application file for complete search history.

(56) References Cited

U.S. PATENT DOCUMENTS

| | | | |
|---|---|---|---|
| 6,014,744 A * | 1/2000 | McKaughan | G06F 9/4401 713/100 |
| 6,434,696 B1 * | 8/2002 | Kang | G06F 1/24 713/2 |
| 6,678,788 B1 | 1/2004 | O'Connell | |
| 6,691,209 B1 | 2/2004 | O'Connell | |
| 6,718,481 B1 | 4/2004 | Fair | |
| 6,865,157 B1 | 3/2005 | Scott et al. | |
| 6,965,989 B1 * | 11/2005 | Strange | G06F 1/24 709/220 |
| 7,219,260 B1 | 5/2007 | de Forest et al. | |
| 7,627,779 B2 | 12/2009 | Fair | |
| 7,809,975 B2 | 10/2010 | French et al. | |
| 7,852,781 B1 | 12/2010 | Felton et al. | |
| 8,037,243 B1 | 10/2011 | Gasser et al. | |
| 8,429,390 B2 * | 4/2013 | Yu | G06F 9/4401 710/8 |
| 2004/0153738 A1 * | 8/2004 | Otaka | G06F 11/1433 714/6.12 |
| 2005/0018618 A1 * | 1/2005 | Mualem | H04L 63/1458 370/252 |

(Continued)

*Primary Examiner* — Jaweed A Abbaszadeh
*Assistant Examiner* — Cheri L Harrington
(74) *Attorney, Agent, or Firm* — BainwoodHuang

(57) ABSTRACT

A technique involves performing, in a data storage system, a full-boot procedure which includes a set of critical boot activities and a set of avoidable boot activities. The technique further involves providing, in response to completion of the full-boot procedure, a fastboot notification indicating to the data storage system that a fastboot procedure is to be performed in response to a warm boot event. The technique further involves placing, after providing the fastboot notification, the data storage system into a normal operating mode in which the data storage system performs data storage operations in response to data storage requests from a set of external host computers. Such operation enables the data storage system to subsequently perform a fastboot procedure that avoids the set of avoidable boot activities in response to the next warm boot event.

21 Claims, 5 Drawing Sheets

(56) References Cited

U.S. PATENT DOCUMENTS

| | | | |
|---|---|---|---|
| 2005/0228980 A1* | 10/2005 | Brokish | G06F 21/575 713/2 |
| 2006/0242398 A1* | 10/2006 | Fontijn | G06F 9/4406 713/2 |
| 2006/0259819 A1* | 11/2006 | Connor | G06F 21/10 714/38.14 |
| 2006/0282654 A1* | 12/2006 | Veen | G06F 9/4418 713/1 |
| 2007/0028084 A1* | 2/2007 | Yu | H04L 67/34 713/1 |
| 2007/0055860 A1* | 3/2007 | Wang | G06F 1/3203 713/2 |
| 2007/0157015 A1* | 7/2007 | Swanson | G06F 9/4401 713/2 |
| 2007/0260867 A1* | 11/2007 | Ethier | G06F 9/4418 713/2 |
| 2008/0072028 A1* | 3/2008 | Allison | G06F 9/4418 713/1 |
| 2009/0259854 A1* | 10/2009 | Cox | G06F 21/575 713/189 |
| 2010/0205410 A1* | 8/2010 | Alambritis | G06F 9/485 712/220 |
| 2011/0055538 A1* | 3/2011 | Cho | G06F 9/4418 713/2 |
| 2011/0143809 A1* | 6/2011 | Salomone | G06F 1/24 455/550.1 |
| 2012/0060023 A1* | 3/2012 | Park | G06F 9/4406 713/2 |
| 2012/0233451 A1* | 9/2012 | Liu | G06F 1/3203 713/2 |
| 2012/0239918 A1* | 9/2012 | Huang | G06F 9/4401 713/2 |
| 2012/0278600 A1* | 11/2012 | Mese | G06F 9/4401 713/2 |
| 2013/0111199 A1* | 5/2013 | Watanabe | G06F 9/4406 713/1 |
| 2013/0159690 A1* | 6/2013 | Tsukamoto | G06F 1/26 713/2 |
| 2015/0095904 A1* | 4/2015 | Ahmadi-Ardakani | G06F 8/63 717/177 |
| 2017/0286679 A1* | 10/2017 | Khare | G06F 21/566 |
| 2018/0032349 A1* | 2/2018 | Bhimanadhuni | G06F 3/0604 |
| 2018/0095806 A1* | 4/2018 | Aneja | G06F 9/542 |
| 2018/0165101 A1* | 6/2018 | Bulusu | G06F 9/4403 |

* cited by examiner

REACHING A NORMAL OPERATING MODE VIA A FASTBOOT PROCEDURE

BACKGROUND

A conventional data storage system stores and retrieves host data on behalf of one or more host computers. Such host data may be block-based, file-based, or combinations thereof.

Before the data storage system is ready for operation, the data storage system typically boots an operating system. This boot process requires a variety of tasks and actions to be completed such as loading the system with the correct initial state, verifying the system's overall health, and mounting the final root file system. Once these tasks/actions have completed successfully, the data storage system is able to respond to input/output (I/O) requests from the host computers.

SUMMARY

Unfortunately, there are deficiencies to the above-described conventional data storage system. In particular, the boot process may take a relatively long time to complete (e.g., several minutes). During this time, the data storage system is unavailable to respond to I/O requests from the host computers (i.e., data unavailability).

In contrast to the above-described conventional data storage system, improved techniques are directed to reaching a normal operating mode via a fastboot procedure. That is, an improved boot process is able to selectively perform a full-boot procedure (in which critical activities and avoidable activities are completed) or a fastboot procedure (in which only critical activities are completed) depending on the particular data storage system state. Along these lines, suppose that a data storage system has completed the full-boot procedure and now requires a simple reboot (e.g., due to modification of an operating parameter). In such a situation, if the remaining portions of the data storage system are still intact (e.g., the partitions have not been altered or corrupted, there has been no change to the health of the system, etc.) it may be unnecessary to re-perform all of the booting activities. That is, activities such as comparing firmware versions to determine whether a new firmware update is available, checking for power-on self-test errors, validating partitions, etc. are unnecessary and can be avoided. Accordingly, the data storage system performs the fastboot procedure in place of the full-boot procedure to complete the critical (or necessary) tasks. As a result, the time for the data storage system to return to the normal operating mode is greatly reduced.

One embodiment is directed to a method of reaching a normal operating mode in which a data storage system performs data storage operations in response to data storage requests from a set of external host computers. The method is performed in the data storage system and includes performing a full-boot procedure which includes a set of critical boot activities and a set of avoidable boot activities. The method further includes providing, in response to completion of the full-boot procedure, a fastboot notification indicating to the data storage system that a fastboot procedure is to be performed in response to a warm boot event. The method further includes placing, after providing the fastboot notification, the data storage system into the normal operating mode in which the data storage system performs the data storage operations in response to the data storage requests from the set of external host computers.

In some arrangements, providing the fastboot notification includes setting a fastboot flag in memory of the data storage system to an asserted state. In particular, the fastboot flag may reside in a designated location within a non-volatile random-access memory (NVRAM) device (e.g., a memory chip on a storage processor motherboard).

In some arrangements, the device is accessible by processing circuitry of the data storage system while the data storage system is in a booting mode that is different from the normal operating mode. In these arrangements, the method includes (a) detecting, by the processing circuitry, a warm boot event which transitions the data storage system from the normal operating mode to the booting mode, (b) in response to the warm boot event and while the data storage system is in the booting mode, reading, by the processing circuitry, the fastboot flag from a location in the memory device, and (c) performing, by the processing circuitry, a boot process which includes (i) the full-boot procedure if the fastboot flag is set to a de-asserted state, and (ii) the fastboot procedure rather than the full-boot procedure if the fastboot flag is set to the asserted state.

In some arrangements, the fastboot flag that is read from the location in the memory device is set to the asserted state. In these arrangements, performing the boot process includes performing the fastboot procedure rather than the full-boot procedure in response to the fastboot flag being set to the asserted state.

In some arrangements, performing the fastboot procedure includes setting the fastboot flag in the memory device to the de-asserted state and, after the fastboot flag is set to the de-asserted state, performing the set of critical boot activities.

In some arrangements, the method further includes, after the fastboot flag is set to the de-asserted state and in response to the set of critical boot activities completing successfully, re-setting the fastboot flag in the location in the memory device back to the asserted state. In these arrangements, the method further includes transitioning the data storage system from the booting mode back to the normal operating mode in which the data storage system performs the data storage operations in response to the data storage requests from the set of external host computers.

In some arrangements, the method further includes:

(a) after the fastboot flag is set to the de-asserted state and in response to a failure of the set of critical boot activities to complete successfully, reading the fastboot flag from the location in the memory device, and (b) in response to the fastboot flag being set to the de-asserted state, (i) performing the full-boot procedure, (ii) re-setting the fastboot flag in the location in the memory device back to the asserted state, and (iii) transitioning the data storage system from the booting mode back to the normal operating mode in which the data storage system performs the data storage operations in response to the data storage requests from the set of external host computers.

In some arrangements, performing the full-boot procedure includes performing, as one of the set of avoidable boot activities, a firmware version comparison operation that compares a version identifier of a currently running version of firmware to a version identifier stored in the memory to determine whether to perform a firmware upgrade. In these arrangements, the fastboot procedure avoids performance of the firmware version comparison operation before transitioning the data storage system from the booting mode back to the normal operating mode.

In some arrangements, performing the full-boot procedure includes performing, as one of the set of avoidable boot activities, a power-on self-test (POST) error check operation that checks for POST errors. In these arrangements, the fastboot procedure avoids performance of the POST error check operation before transitioning the data storage system from the booting mode back to the normal operating mode.

In some arrangements, performing the full-boot procedure includes performing, as one of the set of avoidable boot activities, backup-boot partition and root-recovery partition validation operations that check a backup-boot partition and a root-recovery partition of the data storage system for consistency. In these arrangements, the fastboot procedure avoids performance of the backup-boot partition and root-recovery partition validation operations before transitioning the data storage system from the booting mode back to the normal operating mode.

In some arrangements, performing the full-boot procedure includes performing, as one of the set of avoidable boot activities, boot, root, and swap partition validation operations that check a boot partition, a root partition, and a swap partition of the data storage system for consistency. In these arrangements, the fastboot procedure avoids performance of the boot, root, and swap partition validation operations before transitioning the data storage system from the booting mode back to the normal operating mode.

In some arrangements, each of (i) performing the full-boot procedure and (ii) performing the fastboot procedure includes, after performing a series of boot operations from an initial root file system, performing a file system pivot operation to perform as subsequent series of boot operations from a storage array root file system in place of the initial root file system.

In some arrangements, the method further includes, after the data storage system has transitioned into the normal operating mode, writing host data into and reading host data from an array of storage devices in response to host input/output (I/O) requests from the set of external host computers.

In some arrangements, the method further includes, after the data storage system has transitioned into the normal operating mode and in response to a cold boot event, transitioning from the normal operating mode to a booting mode and, while in the booting mode, re-performing the full-boot procedure which includes the set of critical boot activities and the set of avoidable boot activities.

Another embodiment is directed to data storage equipment which includes a communications interface, memory, and control circuitry coupled to the communications interface and the memory. The memory stores instructions which, when carried out by the control circuitry, cause the control circuitry to:

(A) perform a full-boot procedure which includes a set of critical boot activities and a set of avoidable boot activities, (B) in response to completion of the full-boot procedure, provide a fastboot notification indicating to the data storage system that a fastboot procedure is to be performed in response to a warm boot event, and (C) after providing the fastboot notification, place the data storage system into the normal operating mode in which the data storage system performs data storage operations in response to data storage requests from a set of external host computers received through the communications interface.

In some arrangements, the control circuitry is constructed and arranged to, in response to the fastboot notification, perform a fastboot procedure rather than the full-boot procedure in response to the warm boot event.

Yet another embodiment is directed to a computer program product having a non-transitory computer readable medium which stores a set of instructions that directs a data storage system to reach a normal operating mode in which the data storage system performs data storage operations in response to data storage requests from a set of external host computers. The set of instructions, when carried out by computerized circuitry of the data storage system, causes the computerized circuitry to perform a method of:

(A) performing a full-boot procedure which includes a set of critical boot activities and a set of avoidable boot activities;

(B) in response to completion of the full-boot procedure, providing a fastboot notification indicating to the data storage system that a fastboot procedure is to be performed in response to a warm boot event; and (C) after providing the fastboot notification, placing the data storage system into the normal operating mode in which the data storage system performs the data storage operations in response to the data storage requests from the set of external host computers.

It should be understood that, in the cloud context, at least some of electronic circuitry (e.g., one or more of the host computers) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in reaching a normal operating mode via a fastboot procedure.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing a boot process that is able to selectively perform a full-boot procedure (in which critical activities and avoidable activities are completed) or a fastboot procedure (in which only the critical activities are completed) depending on particular data storage system state. Along these lines, suppose that a data storage system is in a normal operating mode after completing the full-boot procedure and now requires a simple reboot (e.g., due to modification of an operating parameter). In such a situation, if the remaining portions of the data storage system are still intact (e.g., partitions have not been altered or corrupted, there is been no change to the health of the system, etc.) it may be unnecessary to re-perform all of the booting activities. That is, avoidable activities such as comparing firmware versions to determine whether a new firmware update is available, checking for power-on self-test (POST) errors, validating partitions, etc. are unnecessary and can be skipped. Accordingly, the data storage system performs the fastboot procedure in place of the full-boot procedure to complete just the critical activities. Thus, the time for the data storage system to return to the normal operating mode is greatly reduced.

Figure 1:
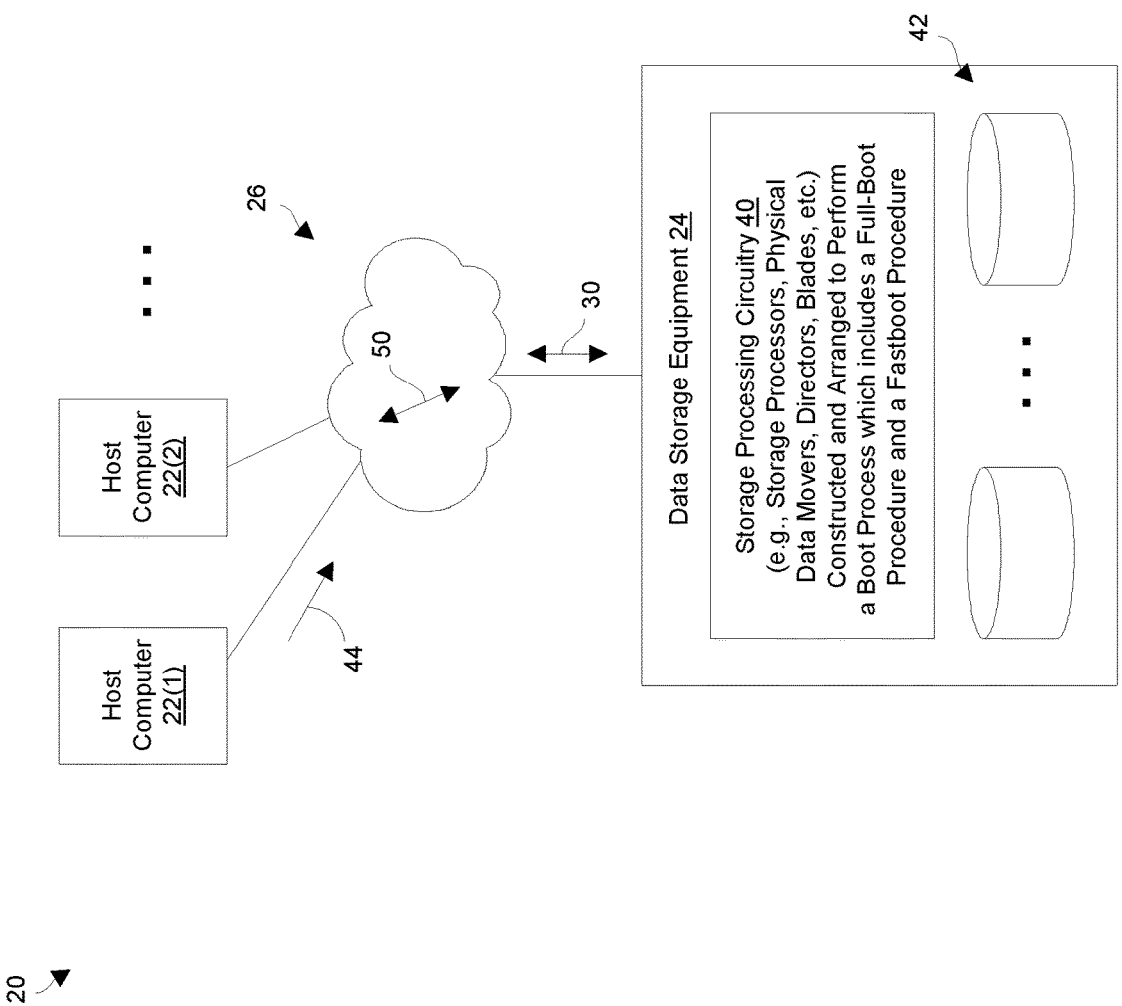
FIG. 1 is a block diagram of a data storage environment which utilizes a data storage system that is able to reach a normal operating mode via a fastboot procedure.

FIG. 1 shows a data storage environment 20 having data storage equipment that is able to reach a normal operating mode via a fastboot procedure. The data storage environment 20 includes host computers 22(1), 22(2), . . . (collectively, host computers 22), data storage equipment 24, and communications medium 26. The data storage environment 20 may include other devices as well (e.g., replication equipment, data manager devices, service processors, etc.).

Each host computer 22 is constructed and arranged to access host data 30 that is maintained by the data storage equipment 24. Along these lines, the host computers 22 may operate as independent devices, as one or more clusters, or combinations thereof to perform useful work (e.g., to operate as front-ends to databases, as webservers, as content servers, as email servers, combinations thereof, etc.).

The data storage equipment 24 is constructed and arranged to manage host data 30 on behalf of the host computers 22. The host data 30 may reside in files of file systems, as block-based data within logical units of storage (LUNs) or volumes, volumes within files, file systems within volumes, combinations thereof, and so on. The particular storage techniques that are put in use (e.g., file-based, block-based, etc.) may be application dependent and can be configured by a human operator (or administrator) of the data storage environment 20.

As shown in FIG. 1, the data storage equipment 24 includes storage processing circuitry 40 and an array of storage devices 42. The storage processing circuitry 40 is constructed and arranged to perform data storage operations in response to data storage requests 44 from the host computers 22. The array of storage devices 42 (e.g., flash memory devices, magnetic disk drives, combinations thereof, etc.) stores the host data 30 in a non-volatile and fault tolerant manner (e.g., in disk pools running RAID1, RAID5, RAID6, etc.).

The communications medium (or fabric) 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

When beginning operation, the data storage equipment 24 initiates a boot process and performs a full-boot procedure. This may also be referred to as a "cold" boot since this full-boot procedure is performed when the power to the data storage equipment 24 is initially off (i.e., the data storage equipment is "cold") and then turned on. At this time, the data storage equipment 24 is not yet ready to perform data storage operations on behalf of the host computers 22. Rather, the data storage equipment 24 is in a booting mode since the data storage equipment 24 is in the process of booting an operating system. As will be explained in further detail shortly, the full-boot procedure includes performance of extensive startup tasks and actions in which the data storage circuitry performs power-on self-tests and error checking, firmware assessment, partition validation, and so on. As a result, it may take several minutes for the data storage equipment 24 to transition from the booting mode to a normal operating mode in which the data storage equipment 24 is properly configured to perform data storage operations in response to the data storage requests 44 from the host computers 22.

Nevertheless, once the data storage equipment 24 has reached the normal operating mode, the data storage equipment 24 is properly configured to robustly and reliably perform data storage operations on behalf of the host computers 22. In particular, the data storage equipment 24 may perform a variety of storage-based operations (e.g., process SCSI read and write commands, perform deduplication, create snapshots, perform backups/replication/archiving, etc.). In some arrangements, the data storage equipment 24 is provisioned with load balancing and fault tolerance features (e.g., redundant hardware, RAID groups, standby devices for possible data recovery, etc.). In some arrangements, the data storage equipment 24 performs one or more virtualization techniques such as instantiating virtual data movers, providing thin provisioning, and so on.

At some point, the data storage equipment 24 may require rebooting. For example, an operating parameter of a component of the data storage equipment 24 may have been adjusted. In such a situation, the data storage equipment 24 does not need to re-perform the above-described full-boot procedure. Rather, one should appreciate that the full-boot procedure includes a set of critical (or necessary) activities and a set of non-critical (or avoidable) activities. Moreover, certain operations of the full-boot procedure such as performing firmware version comparison to determine whether a firmware upgrade is necessary, checking hardware for POST errors, validating partitions that have not been altered or corrupted, etc. are unnecessary.

Accordingly, when carrying out the reboot, the data storage equipment 24 performs a fastboot procedure which omits some or all of the avoidable activities. This may also be referred to as a "warm" boot since the power to the data storage equipment 24 remains on (i.e., the data storage equipment is still "warm"). In particular, the data storage equipment 24 transitions from the normal operating mode back to the booting mode to reboot and reconfigure the necessary portions of the operating system. As will be explained in further detail shortly, since the fastboot procedure skips over particular non-essential activities, the fastboot procedure takes significantly less time (e.g., half a minute) and thus is able to transition the data storage equipment 24 from the booting mode back to the normal operating mode in less time to quickly restore availability to the host computers 22. Further details will now be provided with reference to FIG. 2.

Figure 2:
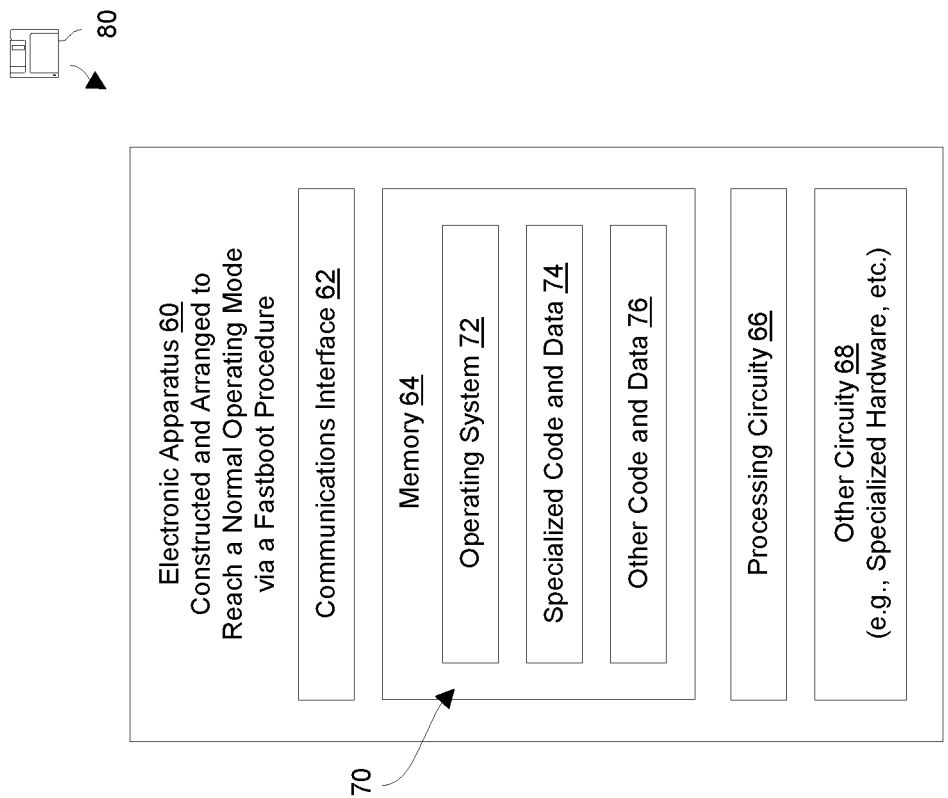
FIG. 2 is a block diagram of a storage processing apparatus of FIG. 1 in accordance with some embodiments.

FIG. 2 shows an electronic apparatus 60 which is suitable for use in the above-mentioned data storage equipment 24 (also see the storage processing circuitry 40 in FIG. 1). The electronic apparatus 60 includes a communications interface 62, memory 64, processing circuitry 66, and other circuitry 68.

The communications interface 62 is constructed and arranged to connect the electronic apparatus 60 to the communications medium 26 (also see FIG. 1) to enable electronic communications with other components of the data storage environment 20. Such communications may be SAN-based, IP-based, cellular-based, cable-based, fiber-optic-based, wireless, cloud-based, combinations thereof, and so on. Accordingly, the communications interface 62 enables the electronic apparatus 60 to robustly and reliably communicate with other devices.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized code and data 74, and perhaps other applications and data 76. The operating system 72 includes code such as a kernel to manage computerized resources (e.g., processor cycles, memory space, etc.), drivers, and so on. The specialized code and data 74 enables performance of the earlier-mentioned specialized boot process. The other applications and data 76 provides other features and may depend on other uses of the electronic apparatus 60 (e.g., utilities, firmware to be upgraded, etc.).

The processing circuitry 66 is constructed and arranged to operate in accordance with the various software constructs 70 stored in the memory 64. Along these lines, the processing circuitry 66 operates in accordance with the specialized code and data 74 to form the specialized circuitry for the earlier-mentioned boot process that selectively performs a full-boot procedure or a fastboot procedure. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic apparatus 60. In particular, the computer program product 80 has a non-transitory (or non-volatile) computer readable medium which stores a set of instructions which controls one or more operations of the electronic apparatus 60. Examples of suitable computer readable storage media include tangible articles of manufacture and apparatus which store instructions in a non-volatile manner such as flash memory, DVD, CD-ROM, disk memory, tape memory, and the like.

The other circuitry 68 represents other specialize hardware of the electronic apparatus 60 (e.g., storage device controllers, backup power supplies to persist memory, etc.). Further details will now be provided with reference to FIGS. 3 through 5.

Figure 3:
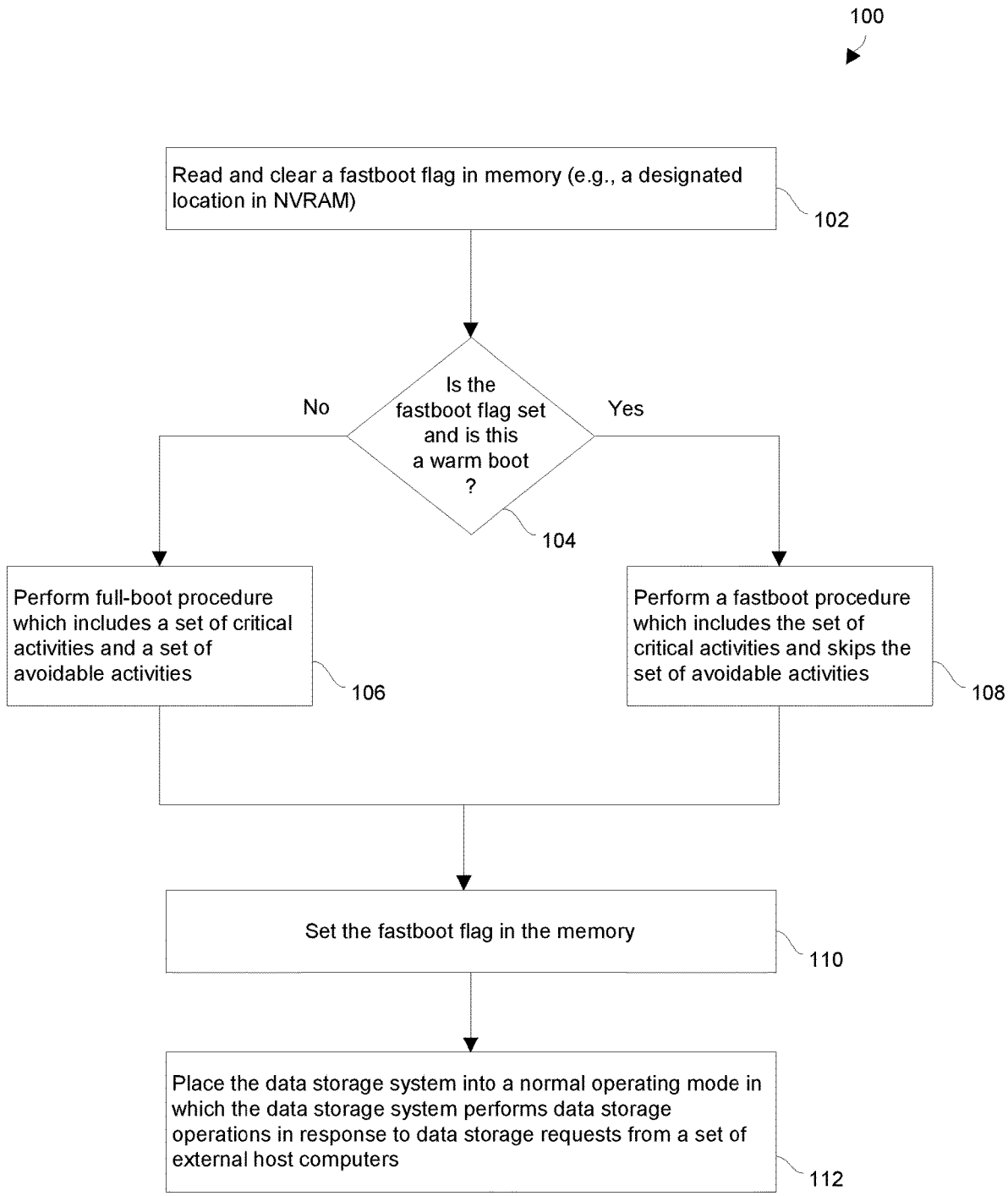
FIG. 3 is a flowchart of a boot process which is performed by the storage processing apparatus of FIG. 2 in accordance with some embodiments.
Figure 4:
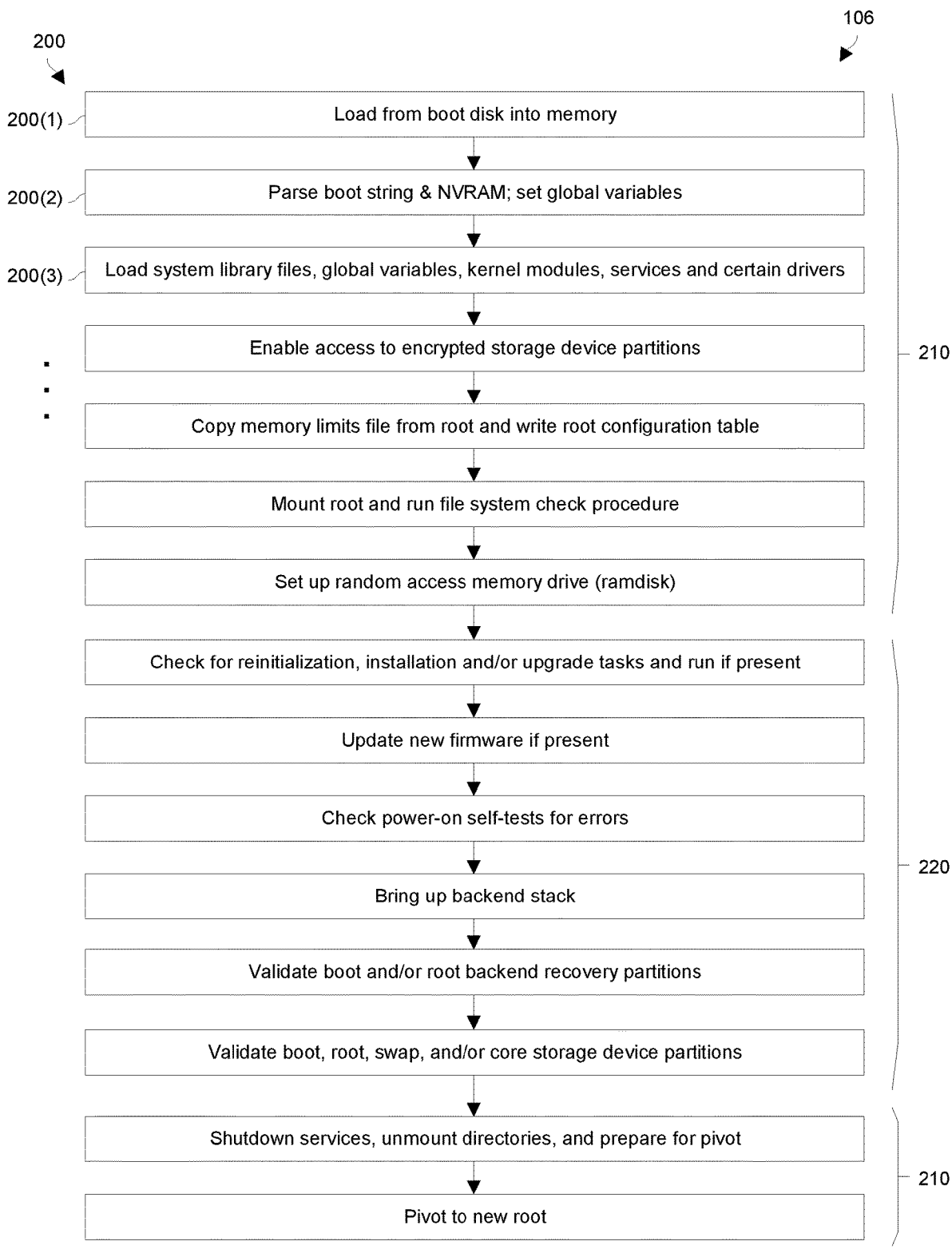
FIG. 4 is a flowchart of an example full-boot procedure of the boot process of FIG. 3 in accordance with some embodiments.
Figure 5:
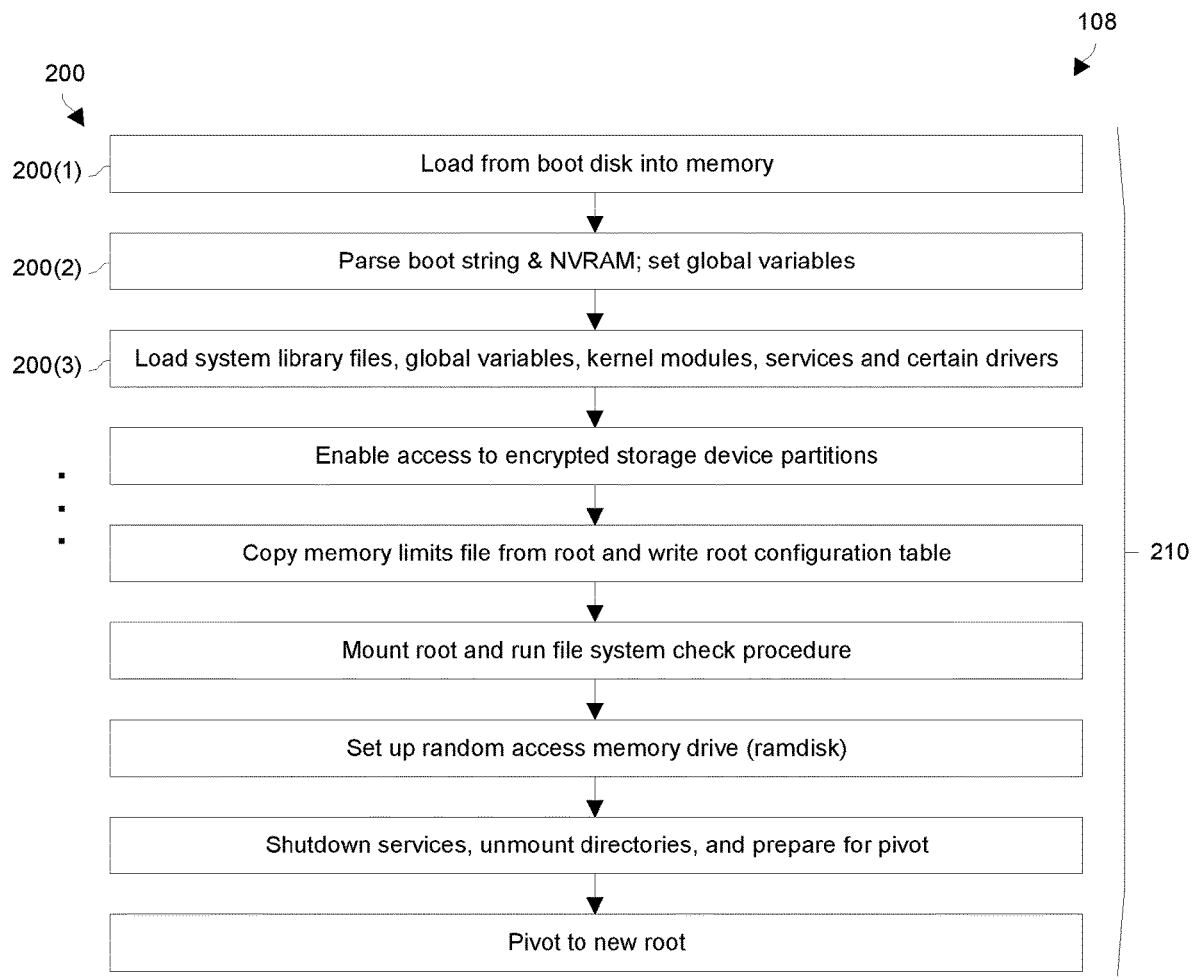
FIG. 5 is a flowchart of an example fastboot procedure of the boot process of FIG. 3 in accordance with some embodiments.

FIGS. 3 through 5 show particular booting details of the data storage equipment 24. FIG. 3 is a flowchart of a boot process 100 in accordance with some arrangements. FIG. 4 shows particular details of a full-boot procedure of the boot process 100 in accordance with some arrangements. FIG. 5 shows particular details of a fastboot procedure of the boot process 100 in accordance with some arrangements.

With reference to FIG. 3, the boot process 100 begins at 102 in response to any of a variety of signals. For example, the boot process 100 may begin when power to the data storage system 24 is initially turned on, when the data storage system 24 receives a restart command manually provided by a user, or when the data storage system 24 detects an event and automatically attempts to reboot. In some arrangements, when the data storage system 24 is currently running, the data storage system 24 may attempt to perform a set of shutdown operations to gracefully complete partially-performed operations, close files, save status, etc. prior to beginning the boot process 100.

At 102, the processing circuitry of the data storage equipment 24 reads and then clears a fastboot flag from memory (also see the memory 62 and the processing circuitry 64 in FIG. 2). The fastboot flag (e.g., a single bit) has either an asserted state (e.g., when set to "1") or a de-asserted state (e.g., when set to "0"). In some arrangements, the processing circuitry clears the fastboot flag once the processing circuitry recognizes that the fastboot flag is asserted (i.e., the processing circuitry clears/de-asserts the fastboot flag right away as the first task following detecting its assertion).

In some arrangements, the fastboot flag resides in a non-volatile random-access memory (NVRAM) device. Such an NVRAM device is accessible by the processing circuitry while the data storage system 24 is in the booting mode (e.g., while the processing circuitry is operating using an initial file system such as initramfs prior to pivoting to a richer storage array root file system).

At 104, the processing circuitry decides whether to perform the full-boot procedure or the fastboot procedure. In particular, if the fastboot flag is not asserted or if the processing circuitry is performing a cold boot, the processing circuitry proceeds to 106 to perform the full-boot procedure. However, if the fastboot flag is asserted and the processing circuitry is performing a warm boot, the processing circuitry proceeds to 108 to perform the fastboot procedure.

At 106, the processing circuitry performs the full-boot procedure, which includes a set of critical activities and a set of non-critical (or avoidable) activities, rather than the fastboot procedure, and then proceeds to 110. The set of non-critical activities are unnecessary in the sense of needing to be performed during a warm boot following a healthy cold boot. Further details of the full-boot procedure will be provided shortly in connection with FIG. 4.

At 108, the processing circuitry performs the fastboot procedure which includes only the set of critical activities and skips over the set of non-critical activities of the full-boot procedure. Upon successful completion of the fastboot procedure, the processing circuitry proceeds to 110. Further details of the fastboot procedure will be provided shortly in connection with FIG. 5.

At 110, upon successful completion of either the full-boot procedure or the fastboot procedure (i.e., in response to completion of one of the boot procedures and a determination that the data storage system 24 is in a healthy state), the processing circuitry sets the fastboot flag in the memory. Such operation essentially provides a notification indicating to the data storage system 24 that a fastboot procedure is to be performed in response to a warm boot event.

At 112, the processing circuitry, after providing the fastboot notification, places the data storage system 24 into the normal operating mode in which the data storage system 24 performs the data storage operations in response to data storage requests from one or more host computers 22 (FIG. 1).

It should be understood that the fastboot flag remains de-asserted while the processing circuitry performs either the full-boot procedure or the fastboot procedure. Accordingly, if the processing circuitry were to fail while performing the full-boot procedure (at 106) or the fastboot procedure (at 108), the next time the processing circuitry performs the boot process 100, the processing circuitry 100 will detect that the fastboot flag is de-asserted (at 102 and 104) and then perform the full-boot procedure (at 106).

FIG. 4 shows particular details of the full-boot procedure 106 of the boot process 100 in accordance with some arrangements (also see 106 in FIG. 3). It should be understood that these details are provided by way of example only and that aspects such as the particular tasks/activities and their particular order may be different in other arrangements.

As shown in FIG. 4, the full-boot procedure 106 includes a variety of different booting tasks/actions 200(1), 200(2), 200(3), . . . (collectively, booting activities 200). Some of the booting activities 200 belong to a set of critical activities 210 that the data storage system 24 performs to properly configure itself for operation in the normal operating mode regardless of whether the data storage system 24 is performing a cold boot or a warm boot. By way of example, some of the critical activities 210 include loading from a boot disk into memory, accessing NVRAM, establishing general services, and pivoting to a richer storage array root file system among several others.

However, some of the booting activities 200 belong to a set of avoidable activities 220 that the data storage system 24 only needs to perform during a cold boot and does not need to perform if the data storage system 24 is performing a warm boot. By way of example, some of the avoidable activities 220 include updating firmware, checking for POST errors, and validating partitions.

FIG. 5 shows particular details of the fastboot procedure 108 of the boot process 100 in accordance with some arrangements (also see 106 in FIG. 3). Again, it should be understood that these details are provided by way of example only and that aspects such as the particular tasks/activities and their particular order may be different in other arrangements.

As shown in FIG. 5 and in contrast to the full-boot procedure 106 (also see FIG. 4), the booting activities 200 of the fastboot procedure 108 belong to the set of critical activities 210 that the data storage system 24 performs to properly configure itself for operation in the normal operating mode regardless of whether the data storage system 24 is performing a cold boot or a warm boot. That is, the fastboot procedure 108 skips over the set of avoidable activities 220 (FIG. 4) that the data storage system 24 only needs to perform during a cold boot or if the fastboot flag was not asserted.

At this point, one should appreciate that the critical activities 210 such as loading from a boot disk into memory, accessing NVRAM, establishing general services, and pivoting to a richer storage array root file system are performed to properly bring the data storage system 24 into the normal operating mode. However, the avoidable activities 220 such as updating firmware, checking for POST errors, and validating partitions are unnecessary, e.g., because there was no POST performed, the partitions were unaltered or not corrupted, the health of particular components can be checked later in the process, and so on.

As described above, improved techniques are directed to reaching a normal operating mode via a fastboot procedure 108. That is, an improved boot process 100 is able to selectively perform a full-boot procedure 106 (in which critical activities 210 and avoidable activities 220 are completed) or a fastboot procedure 108 (in which only critical activities 210 are completed) depending on the particular data storage system state. Along these lines, suppose that the data storage system 24 has completed the full-boot procedure 106 and now requires a simple reboot (e.g., due to modification of an operating parameter). In such a situation, if the remaining portions of the data storage system 24 are still intact (e.g., the partitions have not been altered or corrupted, there has been no change to the health of the system, etc.) it may be unnecessary to re-perform all of the booting activities 210, 220. That is, activities 220 such as comparing firmware versions to determine whether a new firmware update is available, checking for power-on self-test errors, validating partitions, etc. are unnecessary and can be avoided. Accordingly, the data storage system 24 performs the fastboot procedure 108 in place of the full-boot procedure 106 to complete the critical (or necessary) tasks. As a result, the time for the data storage system 24 to return to the normal operating mode is greatly reduced.

One should appreciate that the above-described techniques do not merely run code that places a system into operation. Rather, the disclosed techniques involve improvements to the technology of configuring a data storage system. With such techniques, there is great efficiency (e.g., avoidance of performing unnecessary operations), less latency, higher data storage system availability, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In some arrangements, the boot process 100 provides a way to skip non-critical software actions/tasks from running to speed up the boot process in a deterministic way. Some Linux-based operating systems use a feature referred to as initramfs/ramdisk during initial boot. The booting kernel uses this initramfs to prepare the system and check overall health before the final root file system is mounted. In some improvement arrangements, an enterprise class feature involves a rich boot initramfs that initially loads. A legacy boot process performs initial kernel/system bring up, executes a series actions/tasks which check hardware and software health and applies configuration updates if necessary. Some of these actions/tasks during the legacy boot process are not necessary on every boot and can balloon the overall boot up time. In accordance with some arrangements, the improved boot process determines that the data storage system is healthy, then on the next boot, the boot process skips non-critical actions for a considerable performance gain. The system is healthy once it has completed a full "cold" boot and achieved a state where it is deemed complete (e.g., "system_complete"). A flag is then set within non-volatile memory to notify the system on its next boot to skip the actions/tasks deemed non-critical to a system which has achieved a full boot and run in "fast boot" mode. Upon next boot, the boot process first clears the non-volatile memory entry for "fast boot", only executes critical system bring up tasks, and skip tasks that are deemed non-critical. It's not until the system reaches the healthy state of "system_complete" again, that "fast boot" is turned back on for the next boot. This boot process allows for the non-critical tasks to execute on a future boot if a system does not reach the healthy state.

In some arrangements, the boot process, on average, spends substantially over two minutes and 15 seconds inside the full-boot procedure before reaching normal operating mode. With the "fast boot" option the fastboot execution is completed in 30 seconds. This reduction in time can greatly improve failover/failback times. Such modifications and enhancements are intended to belong to various embodiments of the disclosure.

What is claimed is:

1. In a data storage system, a method of reaching a normal operating mode in which the data storage system performs data storage operations in response to data storage requests from a set of external host computers, the method comprising:
    performing a full-boot procedure which includes a set of critical boot activities and a set of avoidable boot activities;
    in response to completion of the full-boot procedure, providing a fastboot notification indicating to the data storage system that a fastboot procedure is to be performed in response to a warm boot event; and
    after providing the fastboot notification, placing the data storage system into the normal operating mode in which the data storage system performs the data storage operations in response to the data storage requests from the set of external host computers;
    wherein performing the full-boot procedure and providing the fastboot notification occur while the data storage system operates in a booting mode in which the data storage system does not yet perform the data storage operations in response to the data storage requests from the set external host computers; and
    wherein placing the data storage system into the normal operating mode includes transitioning the data storage system from operating in the booting mode to operating in the normal operating mode.

2. A method as in claim 1 wherein providing the fastboot notification indicating to the data storage system that the fastboot procedure is to be performed in response to the warm boot event includes:
    setting a fastboot flag in memory of the data storage system to an asserted state.

3. A method as in claim 2 wherein the memory of the data storage system includes a memory device that is accessible by processing circuitry of the data storage system while the data storage system is in the booting mode; and
wherein the method further comprises:
    detecting, by the processing circuitry, the warm boot event which transitions the data storage system from operating in the normal operating mode to operating in the booting mode,
    in response to the warm boot event and while the data storage system is in the booting mode, reading, by the processing circuitry, the fastboot flag from a location in the memory device, and
    performing, by the processing circuitry, a boot process which includes (i) the full-boot procedure if the fastboot flag is set to a de-asserted state, and (ii) the fastboot procedure rather than the full-boot procedure if the fastboot flag is set to the asserted state.

4. A method as in claim 3 wherein the fastboot flag that is read from the location in the memory device is set to the asserted state; and
wherein performing the boot process includes performing the fastboot procedure rather than the full-boot procedure in response to the fastboot flag being set to the asserted state.

5. A method as in claim 4 wherein performing the fastboot procedure includes:
    setting the fastboot flag in the memory device to the de-asserted state, and
    after the fastboot flag is set to the de-asserted state, performing the set of critical boot activities.

6. A method as in claim 5, further comprising:
    after the fastboot flag is set to the de-asserted state and in response to the set of critical boot activities completing successfully, re-setting the fastboot flag in the location in the memory device back to the asserted state, and
    transitioning the data storage system from operating in the booting mode back to operating in the normal operating mode in which the data storage system performs the data storage operations in response to the data storage requests from the set of external host computers.

7. A method as in claim 5 wherein the memory device is a non-volatile random-access memory (NVRAM) device which, in the location, persistently stores a current state of the fastboot flag.

8. A method as in claim 5, further comprising:
    after the fastboot flag is set to the de-asserted state and in response to a failure of the set of critical boot activities to complete successfully, reading the fastboot flag from the location in the memory device, and
    in response to the fastboot flag being set to the de-asserted state, (i) performing the full-boot procedure, (ii) re-setting the fastboot flag in the location in the memory device back to the asserted state, and (iii) transitioning the data storage system from operating in the booting mode back to operating in the normal operating mode in which the data storage system performs the data storage operations in response to the data storage requests from the set of external host computers.

9. A method as in claim 5 wherein performing the full boot procedure includes:

performing, as one of the set of avoidable boot activities, a firmware version comparison operation that compares a version identifier of a currently running version of firmware to a version identifier stored in the memory to determine whether to perform a firmware upgrade; and
wherein the fastboot procedure avoids performance of the firmware version comparison operation before transitioning the data storage system from operating in the booting mode back to operating in the normal operating mode.

10. A method as in claim 5 wherein performing the full boot procedure includes:
performing, as one of the set of avoidable boot activities, a power on self test (POST) error check operation that checks for POST errors; and
wherein the fastboot procedure avoids performance of the POST error check operation before transitioning the data storage system from operating in the booting mode back to operating in the normal operating mode.

11. A method as in claim 5 wherein performing the full boot procedure includes:
performing, as one of the set of avoidable boot activities, backup boot partition and root-recovery partition validation operations that check a backup boot partition and a root-recovery partition of the data storage system for consistency; and
wherein the fastboot procedure avoids performance of the backup boot partition and root-recovery partition validation operations before transitioning the data storage system from operating in the booting mode back to operating in the normal operating mode.

12. A method as in claim 5 wherein performing the full boot procedure includes:
performing, as one of the set of avoidable boot activities, boot, root, and swap partition validation operations that check a boot partition, a root partition, and a swap partition of the data storage system for consistency; and
wherein the fastboot procedure avoids performance of the boot, root, and swap partition validation operations before transitioning the data storage system from operating in the booting mode back to operating in the normal operating mode.

13. A method as in claim 5 wherein each of (i) performing the full-boot procedure and (ii) performing the fastboot procedure includes:
after performing a series of boot operations from an initial root file system, performing a file system pivot operation to perform as subsequent series of boot operations from a storage array root file system in place of the initial root file system.

14. A method as in claim 13 wherein performing the full boot procedure includes:
performing, as at least some of the set of avoidable boot activities, (i) a firmware version comparison operation that compares a version identifier of a currently running version of firmware to a version identifier stored in the memory to determine whether to perform a firmware upgrade, (ii) a power on self test (POST) error check operation that checks for POST errors, and (iii) backup boot partition, root-recovery partition, boot partition, root partition, and swap partition validation operations that check a backup boot partition, a root-recovery partition, a boot partition, a root partition, and a swap partition of the data storage system for consistency; and
wherein the fastboot procedure avoids performance of (i) the firmware version comparison operation, (ii) the POST error check operation, and (iii) the backup boot partition, root-recovery partition, boot partition, root partition, and swap partition validation operations before transitioning the data storage system from operating in the booting mode back to operating in the normal operating mode.

15. A method as in claim 1, further comprising:
after the data storage system has transitioned to operating in the normal operating mode, writing host data into and reading host data from an array of storage devices in response to host input/output (I/O) requests from the set of external host computers.

16. A method as in claim 15, further comprising:
after the data storage system has transitioned to operating in the normal operating mode and in response to a cold boot event, transitioning from operating in the normal operating mode to operating in the booting mode and, while operating in the booting mode, re-performing the full-boot procedure which includes the set of critical boot activities and the set of avoidable boot activities.

17. A method as in claim 1, further comprising:
after the data storage system has transitioned to operating in the normal operating mode, performing data storage operations on behalf of the set of external host computers while the fastboot notification is provided within the data storage system to indicate to the data storage system that the fastboot procedure is to be performed in response to the warm boot event.

18. Data storage equipment, comprising:
a communications interface;
memory; and
control circuitry coupled to the communications interface and the memory, the memory storing instructions which, when carried out by the control circuitry, cause the control circuitry to:
perform a full-boot procedure which includes a set of critical boot activities and a set of avoidable boot activities,
in response to completion of the full-boot procedure, provide a fastboot notification indicating to the data storage system that a fastboot procedure is to be performed in response to a warm boot event, and
after providing the fastboot notification, place the data storage system into the normal operating mode in which the data storage system performs data storage operations in response to data storage requests from a set of external host computers received through the communications interface;
wherein the control circuitry performs the full-boot procedure and provides the fastboot notification while the data storage system operates in a booting mode in which the data storage system does not yet perform the data storage operations in response to the data storage requests from the set external host computers; and
wherein the control circuitry, when placing the data storage system into the normal operating mode, is constructed and arranged to transition the data storage system from operating in the booting mode to operating in the normal operating mode.

19. Data storage equipment as in claim 18 wherein the control circuitry is constructed and arranged to:
in response to the fastboot notification indicating to the data storage system that the fastboot procedure is to be performed in response to a warm boot event, perform a fastboot procedure rather than the full-boot procedure in response to the warm boot event.

20. A computer program product having a non-transitory computer readable medium which stores a set of instructions that directs a data storage system to reach a normal operating mode in which the data storage system performs data storage operations in response to data storage requests from a set of external host computers; the set of instructions, when carried out by computerized circuitry of the data storage system, causing the computerized circuitry to perform a method of:

performing a full-boot procedure which includes a set of critical boot activities and a set of avoidable boot activities;

in response to completion of the full-boot procedure, providing a fastboot notification indicating to the data storage system that a fastboot procedure is to be performed in response to a warm boot event; and after providing the fastboot notification, placing the data storage system into the normal operating mode in which the data storage system performs the data storage operations in response to the data storage requests from the set of external host computers;

wherein performing the full-boot procedure and providing the fastboot notification occur while the data storage system operates in a booting mode in which the computerized circuitry of the data storage system does not yet perform the data storage operations in response to the data storage requests from the set external host computers; and wherein placing the data storage system into the normal operating mode includes transitioning the data storage system from operating in the booting mode to operating in the normal operating mode.

21. A computer program product as in claim 20 wherein the method further comprises:

in response to the fastboot notification indicating to the data storage system that the fastboot procedure is to be performed in response to a warm boot event, performing a fastboot procedure rather than the full-boot procedure in response to the warm boot event.

\* \* \* \* \*